US009852063B2

(12) United States Patent
Kanno

(10) Patent No.: US 9,852,063 B2
(45) Date of Patent: Dec. 26, 2017

(54) MEMORY DEVICE AND NON-TRANSITORY COMPUTER READABLE RECORDING MEDIUM

(71) Applicant: Toshiba Memory Corporation, Minato-ku, Tokyo (JP)

(72) Inventor: Shinichi Kanno, Tokyo (JP)

(73) Assignee: Toshiba Memory Corporation, Minato-ku, Tokyo (JP)

( * ) Notice: Subject to any disclaimer, the term of this patent is extended or adjusted under 35 U.S.C. 154(b) by 0 days.

(21) Appl. No.: 14/656,506

(22) Filed: Mar. 12, 2015

(65) Prior Publication Data
US 2016/0188459 A1   Jun. 30, 2016

Related U.S. Application Data

(60) Provisional application No. 62/097,532, filed on Dec. 29, 2014.

(30) Foreign Application Priority Data

Feb. 27, 2015  (JP) ................................. 2015-038998

(51) Int. Cl.
G06F 12/02   (2006.01)
(52) U.S. Cl.
CPC .. G06F 12/0246 (2013.01); *G06F 2212/1036* (2013.01); *G06F 2212/222* (2013.01);
(Continued)
(58) Field of Classification Search
CPC ............. G06F 12/0246; G06F 12/0253; G06F 2212/7205; G06F 12/10; G06F 2212/65; G06F 2212/1044; G06F 2212/2022
See application file for complete search history.

(56) References Cited

U.S. PATENT DOCUMENTS 6,996,676 B2   2/2006  Megiddo et al.
8,166,233 B2   4/2012  Schibilla et al.
(Continued)

FOREIGN PATENT DOCUMENTS

JP   2012-141944 A   7/2012
JP   2013-191174 A   9/2013
(Continued)

OTHER PUBLICATIONS

Radu Stoica, Anastasia Ailamaki, "Improving Flash Write Performance by Using Update Frequency", Aug. 26-30, 2013, Proceeding of the VLDB Edowment, vol. 6, No. 9.*
(Continued)

*Primary Examiner* — Rocio Del Mar Perez-Velez
(74) *Attorney, Agent, or Firm* — White & Case LLP

(57) ABSTRACT

According to one embodiment, a memory device includes a nonvolatile memory, address translation unit, generation unit, and reception unit. The nonvolatile memory includes erase unit areas. Each of the erase unit areas includes write unit areas. The address translation unit generates address translation information relating a logical address of write data written to the nonvolatile memory to a physical address indicative of a write position of the write data in the nonvolatile memory. The generation unit generates valid/invalid information indicating whether data written to the erase unit areas is valid data or invalid data. The reception unit receives deletion information including a logical address indicative of data to be deleted in the erase unit area.

8 Claims, 9 Drawing Sheets

(52) U.S. Cl.
CPC .............. *G06F 2212/7201* (2013.01); *G06F 2212/7209* (2013.01)

(56) References Cited

U.S. PATENT DOCUMENTS

| | | |
|---|---|---|
| 2006/0184720 A1 | 8/2006 | Sinclair et al. |
| 2009/0235015 A1 | 9/2009 | Hatsuda et al. |
| 2010/0217927 A1 | 8/2010 | Song et al. |
| 2011/0029715 A1 | 2/2011 | Hu et al. |
| 2011/0283049 A1* | 11/2011 | Kang ................. G06F 12/0246 711/103 |
| 2012/0144097 A1* | 6/2012 | Hashimoto ......... G06F 12/0246 711/103 |
| 2012/0159051 A1 | 6/2012 | Hida et al. |
| 2013/0007352 A1* | 1/2013 | Maislos .............. G06F 12/0246 711/103 |
| 2013/0135767 A1* | 5/2013 | Hall ........................ G06F 3/061 360/66 |
| 2013/0246688 A1* | 9/2013 | Kanno ................. G06F 12/0246 711/103 |
| 2014/0047210 A1* | 2/2014 | Cohen ..................... G06F 12/00 711/202 |
| 2015/0106556 A1* | 4/2015 | Yu ........................ G11C 16/349 711/103 |

FOREIGN PATENT DOCUMENTS

| | | |
|---|---|---|
| JP | 2014-026635 A | 2/2014 |
| TW | 200641602 A | 12/2006 |
| TW | 201112253 A1 | 4/2011 |

OTHER PUBLICATIONS

Taiwanese Office Action issued on Jun. 15, 2016 in corresponding Taiwanese patent application No. 104114943, along with English translation thereof.

\* cited by examiner

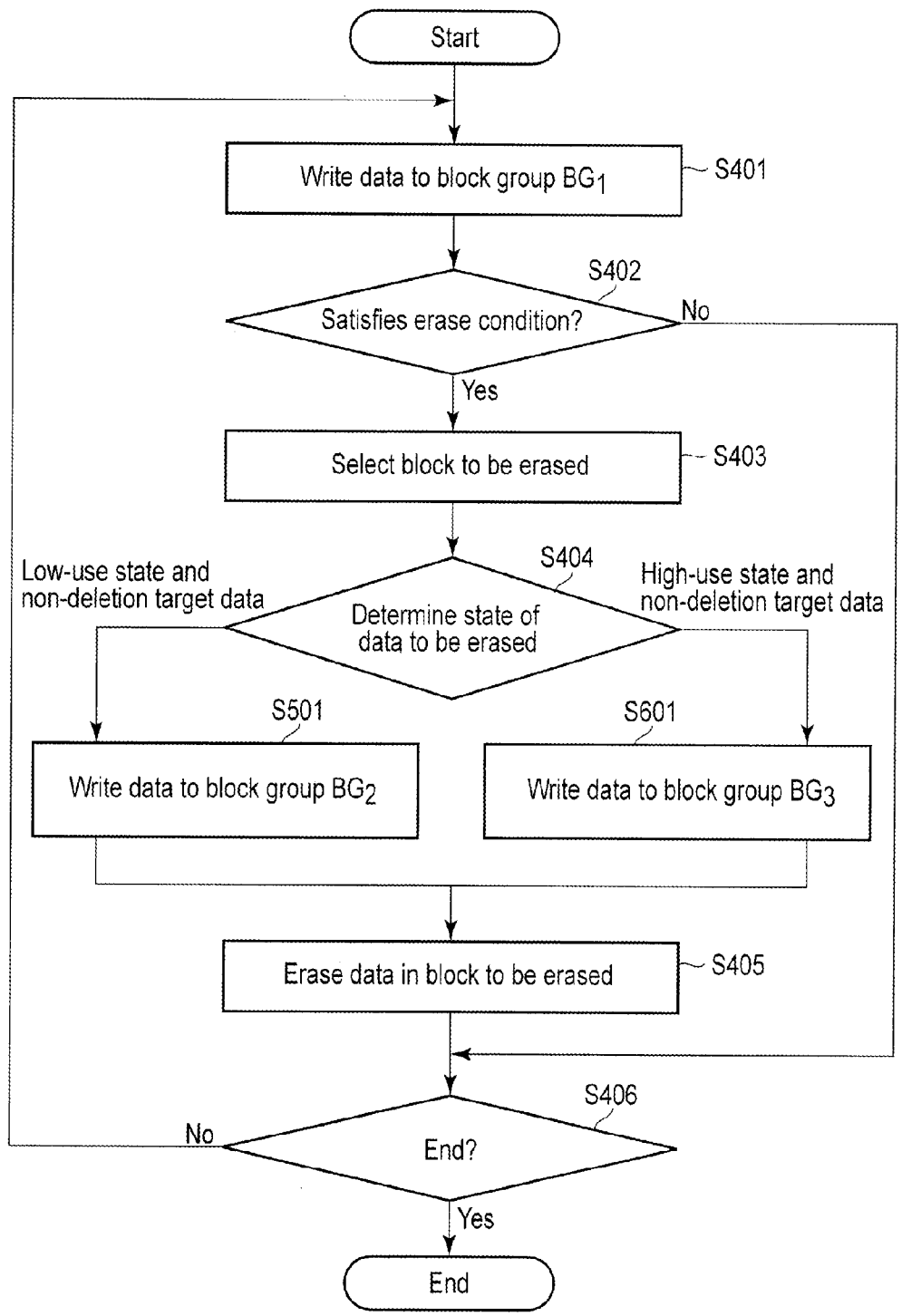
F I G. 4

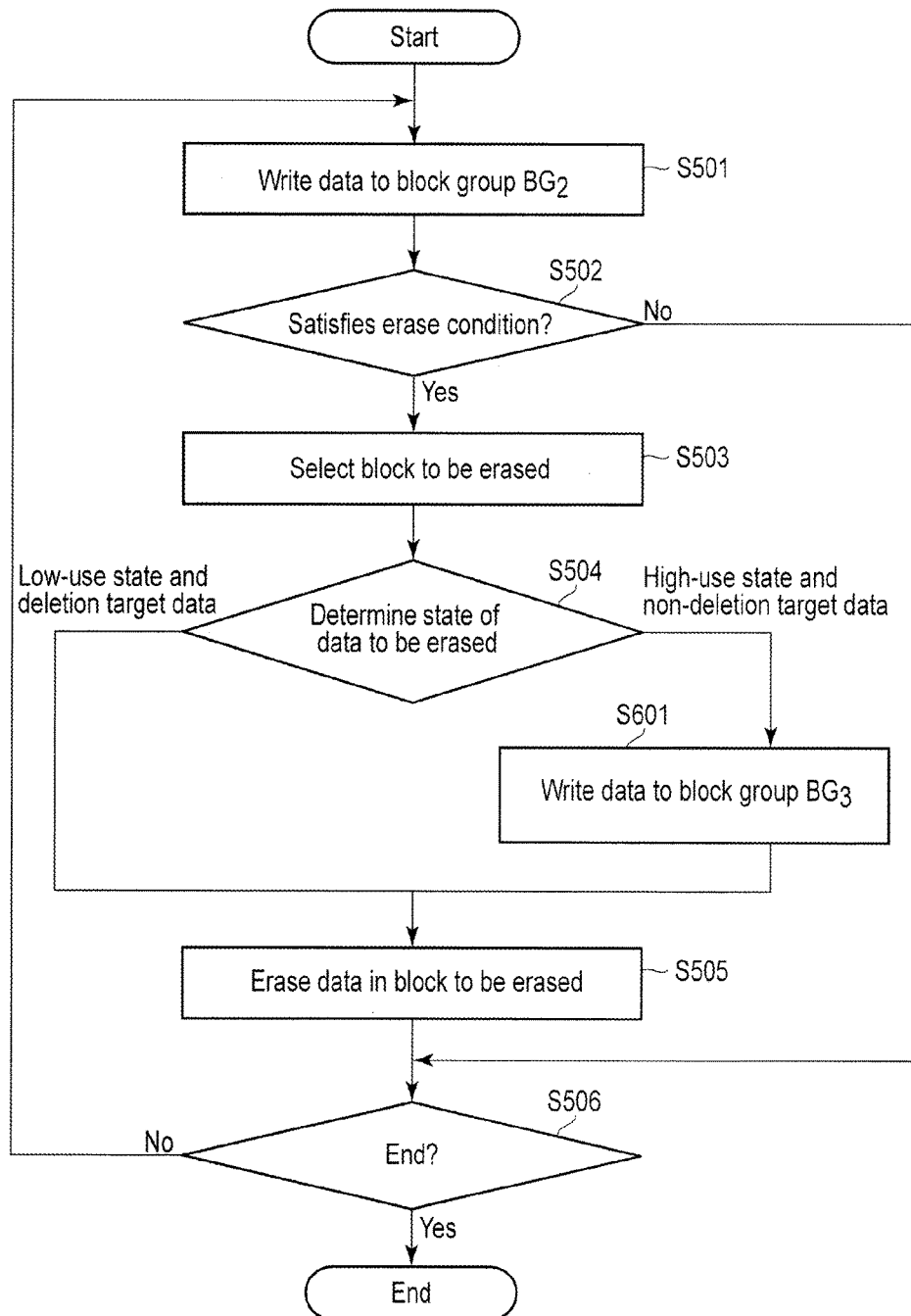
F I G. 5

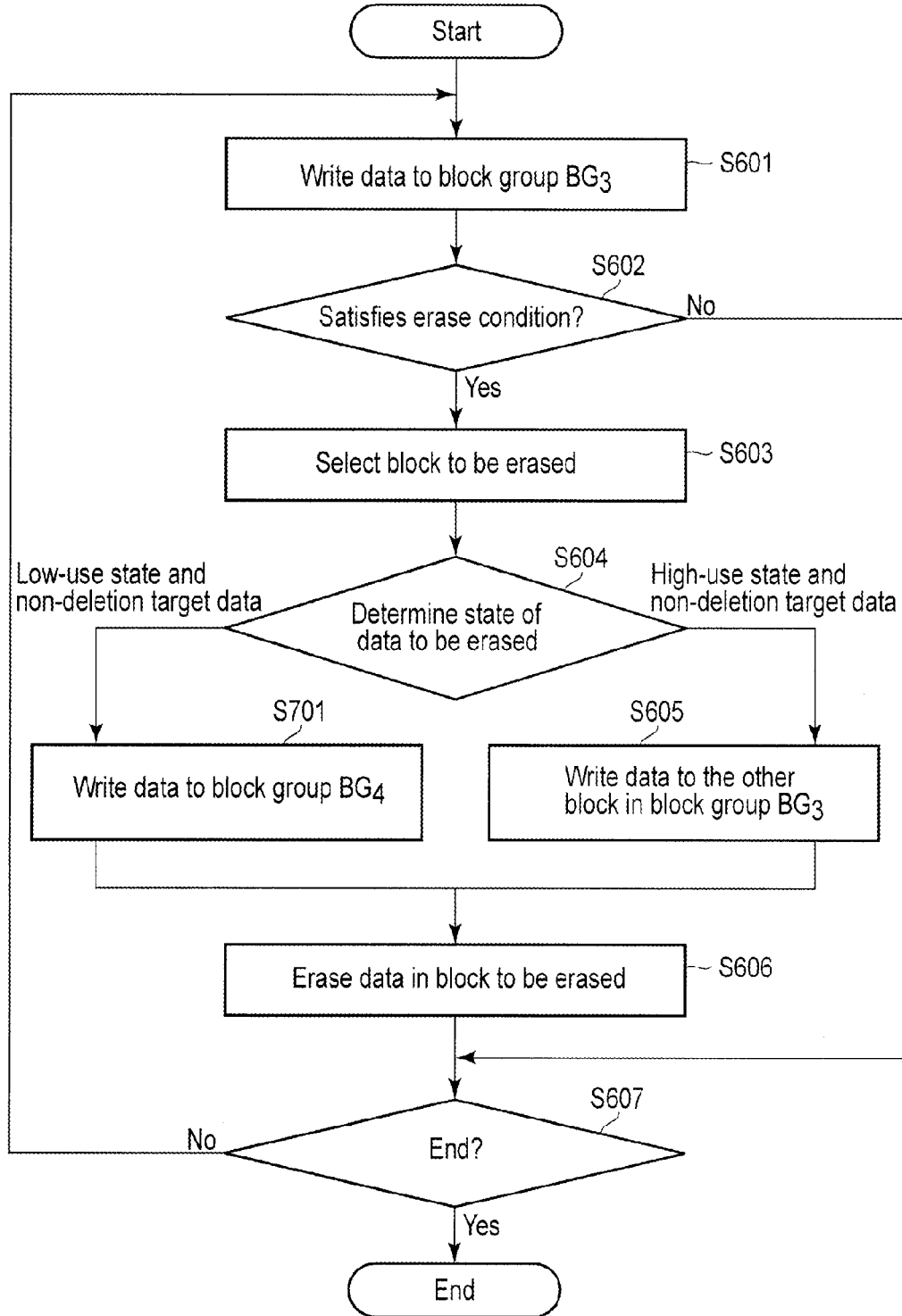
F I G. 6

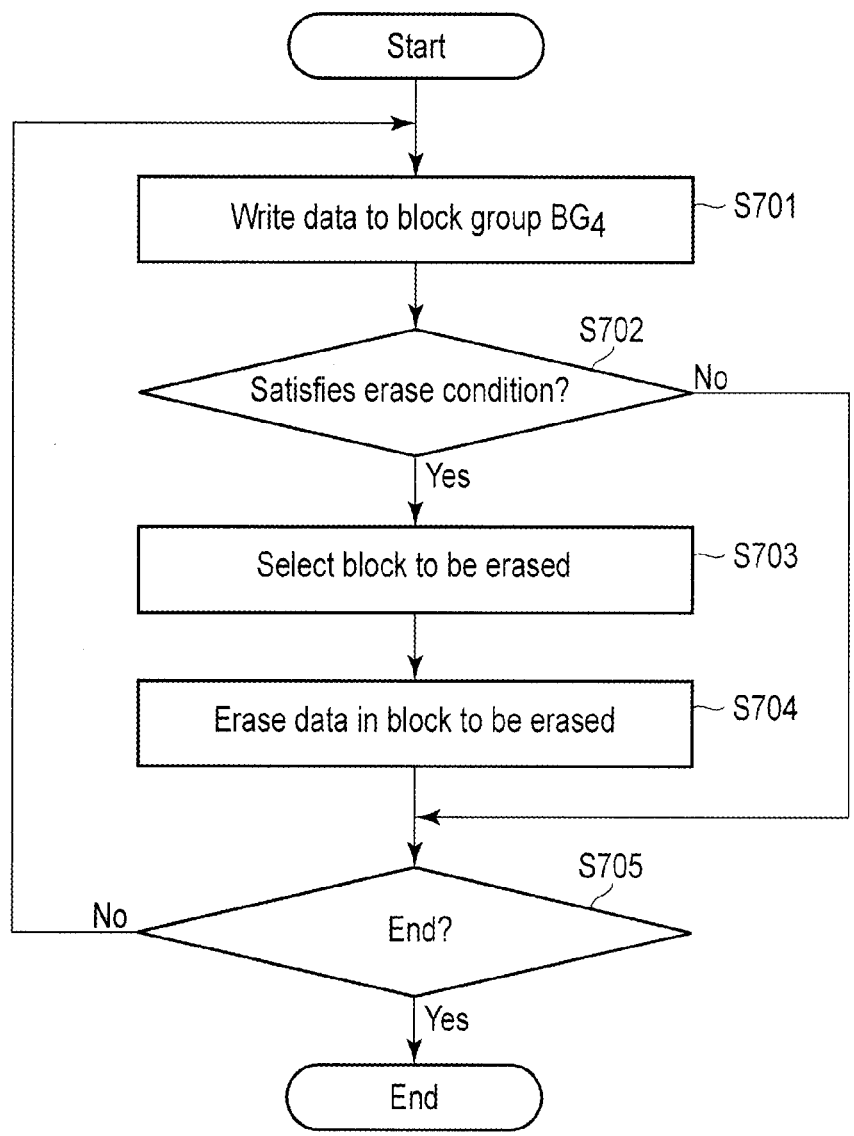
F I G. 7

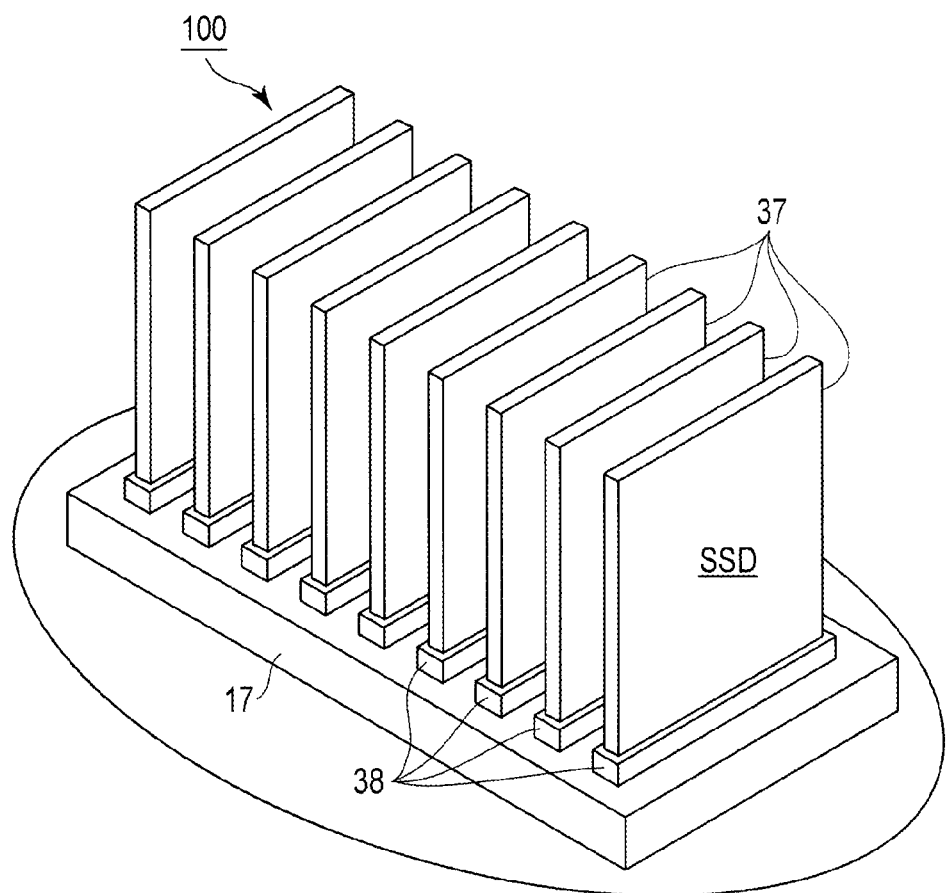
F I G. 9

MEMORY DEVICE AND NON-TRANSITORY COMPUTER READABLE RECORDING MEDIUM

CROSS-REFERENCE TO RELATED APPLICATIONS

This application is based upon and claims the benefit of priority from U.S. Provisional Application No. 62/097,532, filed Dec. 29, 2014; and Japanese Patent Application No. 2015-038998, filed Feb. 27, 2015, the entire contents of all of which are incorporated herein by reference.

FIELD

Embodiments described herein relate generally to a memory device and a non-transitory computer readable recording medium.

BACKGROUND

A solid state drive (SSD) includes a nonvolatile semiconductor memory such as a NAND flash memory. The NAND flash memory includes a plurality of blocks (physical blocks). The plurality of blocks include a plurality of memory cells arranged at crossing points of word lines and bit lines.

BRIEF DESCRIPTION OF THE DRAWINGS

FIG. 4 is a flowchart showing an example of first cache control of the second embodiment;

FIG. 5 is a flowchart showing an example of second cache control of the second embodiment;

FIG. 6 is a flowchart showing an example of third cache control of the second embodiment;

FIG. 7 is a flowchart showing an example of fourth cache control of the second embodiment;

FIG. 9 is a perspective view showing an example of a storage system according to the third embodiment.

DETAILED DESCRIPTION

Figure 1:
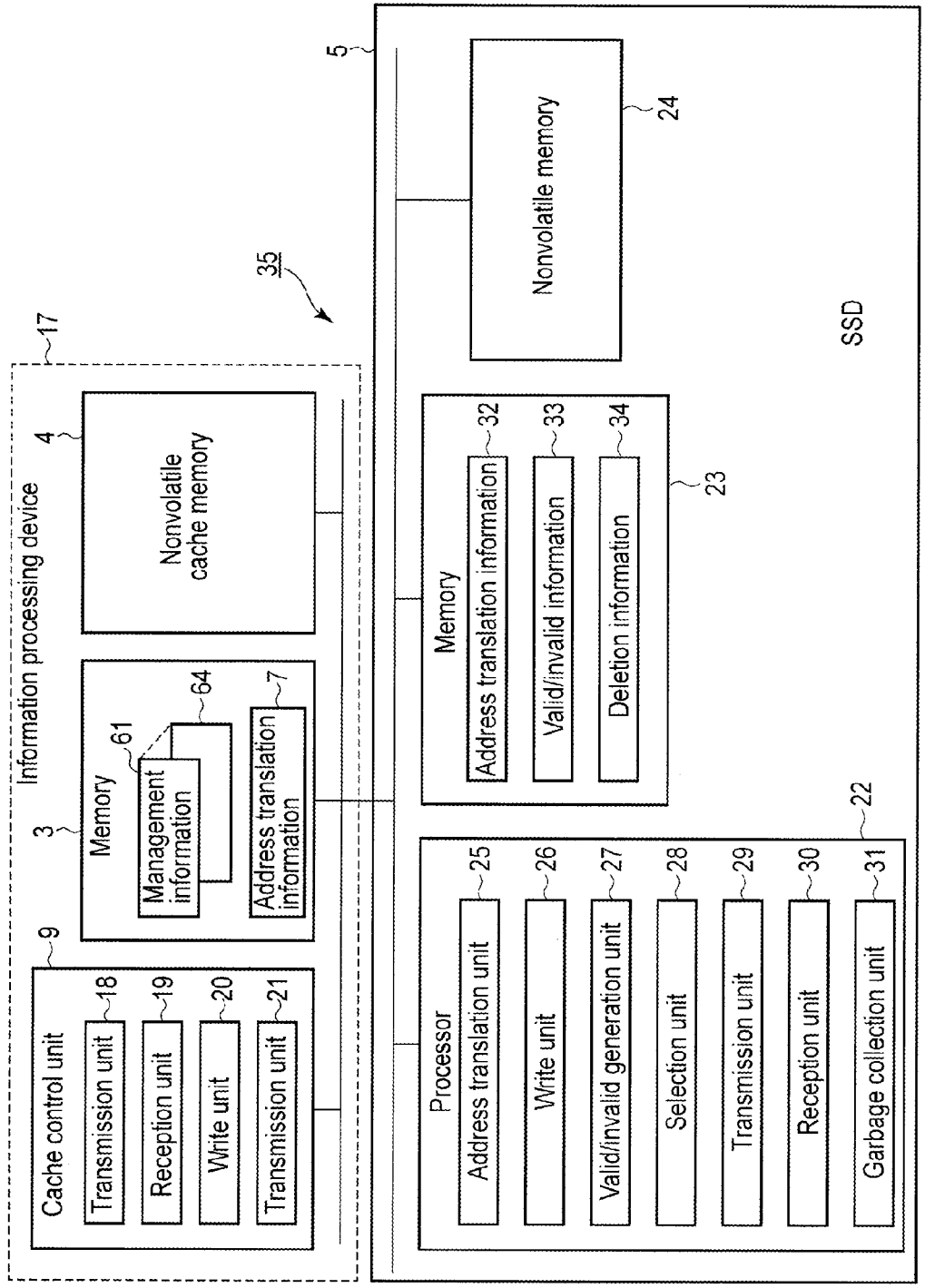
FIG. 1 is a block diagram showing a configuration example of an information processing system according to a first embodiment.

In general, according to one embodiment, a memory device includes a nonvolatile memory, address translation unit, generation unit, and reception unit. The nonvolatile memory includes a plurality of erase unit areas. Each of the erase unit areas includes a plurality of write unit areas. The address translation unit generates address translation information relating a logical address of write data written to the nonvolatile memory to a physical address indicative of a write position of the write data in the nonvolatile memory. The generation unit generates valid/invalid information indicating whether data written to the plurality of erase unit areas is valid data or invalid data. The reception unit receives deletion information including a logical address indicative of data to be deleted in the erase unit area.

Embodiments will be described hereinafter with reference to drawings. In a following description, the same reference numerals denote components having nearly the same functions and arrangements, and a repetitive description thereof will be given if necessary.

In the each of embodiments mentioned later, data is collectively erased per erase unit area in a nonvolatile memory and a nonvolatile cache memory. The erase unit area includes a plurality of write unit areas and a plurality of read unit areas.

In the present embodiment, a NAND flash memory is used as each of the nonvolatile memory and the nonvolatile cache memory. However, each of the nonvolatile memory and the nonvolatile cache memory may be a memory other than the NAND flash memory when the memory satisfies the above relationship among the erase unit area, the write unit area and the read unit area.

When the nonvolatile memory and the nonvolatile cache memory are the NAND flash memories, the erase unit area corresponds to a block. The write unit area and the read unit area correspond to a page.

In the present embodiment, for example, the erase unit area may be controlled in the other unit of, for example, two blocks, which allows data to be collectively erased.

In the present embodiment, access indicates both writing data to a memory device and reading data from the memory device.

[First Embodiment]

In the present embodiment, transmission and reception of data and information between an information processing device and a memory device are described.

In the present embodiment, a logical address (for example, Logical Block Addressing) is used as identification information of data. However, the data may be identified by other information.

FIG. 1 is a block diagram showing a configuration example of an information processing system according to the present embodiment.

An information processing system 35 includes an information processing device 17 and an SSD 5. The SSD 5 is an example of the memory device. The information processing device 17 may be a host device corresponding to the SSD 5.

The SSD 5 may be included in the information processing device 17 or may be connected to the information processing device 17 so as to transmit and receive data via the network, etc. Instead of the SSD 5, the other nonvolatile memory device such as a hard disk drive (HDD) may be used.

The information processing device 17 includes a cache control unit 9, a memory 3 storing management information 61 to 64 and a nonvolatile cache memory 4. However, all or a part of the cache control unit 9, the management information 61 to 64, the memory 3 and the nonvolatile cache memory 4 may be provided outside the information processing device 17.

The memory 3 stores various types of control data such as management information (list) 61 to 64 and address translation information 7. The memory 3 may be a volatile memory such as a dynamic random access memory (DRAM) or a static random access memory (SRAM) or may be a nonvolatile memory. The memory 3 may be included in the nonvolatile cache memory 4. The memory may be included in the nonvolatile cache memory 4.

The management information 61 to 64 is metadata for the data written to the block groups $BG_1$ to $BG_4$ mentioned later, respectively. For example, the management information 61 to 64 includes information indicative of the state of use of the respective data by the processor. For example, the management information 61 to 64 includes identification information of the respective data, deletion information indicative of whether the data is data to be deleted or not, valid/invalid information indicative of whether the data is valid data or not, and cache determination information to determine whether the erase condition for erasing the block is satisfied.

The deletion information is information indicating that a delete command of the data is issued. More specifically, the deletion information is information, etc., indicating that a delete command of the data is received from an application program or an operating system (OS) executed by the processor. In the present embodiment, the deletion information includes, for example, information relating the identification information of each block to a logical address indicative of data to be deleted written to each block.

The valid/invalid information is information indicating that, for example, when the same data is written to a plurality of positions, the latest data is valid data and data other than the latest data is invalid data. In other words, for example, the valid data is updated data in the case where the update of the data written to the nonvolatile cache memory 4 is performed. For example, the invalid data is data which is not updated in the case where the update is performed. In the present embodiment, the valid/invalid information includes, for example, information relating the identification information of each block to a logical address indicative of valid data or invalid data written to each block.

The cache determination information is information, etc., including, for example, at least one of write information and read information per data, or at least one of write information and read information per block.

The write information includes, for example, at least one of write times, write numbers, write frequencies and write orders.

The read information includes, for example, at lest one of read times, read numbers, read frequencies and read orders.

For example, the address translation information 7 relates a logical address of data to a physical address of the nonvolatile cache memory 4 corresponding to the logical address (for example, Physical Block Addressing). The address translation information 7 is managed, for example, in a table form.

The cache control unit 9 executes cache control for the nonvolatile cache memory 4 having the access speed higher than that of the SSD 5. For example, the cache control unit 9 manages data and logical and physical addresses indicative of the data by a write through method or a write back method.

In the write through method, data is stored in the nonvolatile cache memory 4 and also in the SSD 5.

In the write back method, data stored in the nonvolatile cache memory 4 is not stored in the SSD 5 together. The data is first stored in the nonvolatile cache memory 4, and then data pushed out from the nonvolatile cache memory 4 is stored in the SSD 5.

In the first embodiment, the cache control unit 9 includes a transmission unit 18, a reception unit 19, a write unit 20 and a transmission unit 21. All or a part of the cache memory 9 may be implemented by software, or may be implemented by hardware.

The transmission unit 18 transmits, to the SSD 5, write data for the SSD 5 and an address of the write data. In the present embodiment, the address transmitted from the transmission unit 18 to the SSD 5 is, for example, a logical address.

The reception unit 19 receives, from the SSD 5, block information including logical addresses indicative of valid data written to a block to be subjected to garbage collection.

In the present embodiment, the block information may include information relating identification information of each block in the SSD 5 to identification information of data written to each block.

The write unit 20 writes (transcribes) all or a part of the valid data indicated by the logical addresses included in the block information to a memory other than the nonvolatile memory 24 based on the block information received from the SSD 5 and the management information 61 to 64. The other memory may be, for example, the nonvolatile cache memory 4.

For example, the write unit 20 excludes a logical address indicative of data which is data to be deleted(deletion candidate) in the case of receiving a delete command, from the logical addresses indicative of the valid data included in the block information. Thus, the valid data that is written to the block to be subjected to garbage collection and is not data to be deleted can be selected. The write unit 20 writes the selected data to the other memory.

The transmission unit 21 generates deletion information including the logical address indicative of the data is to be deleted and transmits the deletion information to the SSD 5. For example, the deletion information may include a logical address indicative of data which is the deletion target that is not written to the other memory by the write unit 20, of the logical addresses indicative of the valid data included in the block information. Instead of the deletion information, maintaining information including logical addresses of data to be maintained may be transmitted from the transmission unit 21 to the SSD 5.

The SSD 5 includes a processor 22, a memory 23 and the nonvolatile memory 24.

For example, the memory 23 stores various types of control data such as address translation information 32, valid/invalid information 33 and deletion information 34. The memory 23 may be a volatile memory such as a DRAM or an SRAM or may be a nonvolatile memory. The memory 23 may be included in the nonvolatile memory 24.

The processor 22 functions as an address translation unit 25, a write unit 26, a valid/invalid generation unit 27, a selection unit 28, a transmission unit 29, a reception unit 30 and a garbage collection unit 31 by executing a program stored in a memory in the processor 22, a program stored in the memory 23 or a program stored in the nonvolatile memory 24.

In the present embodiment, the program to cause the processor 22 to function as the address translation unit 25, the write unit 26, the valid/invalid generation unit 27, the selection unit 28, the transmission unit 29, the reception unit 30 and the garbage collection unit 31 may be, for example, the OS, middleware or firmware. :n the present embodiment, all or a part of the address translation unit 25, the write unit 26, valid/invalid generation unit 27, the selection unit 28, transmission unit 29, the reception unit 30 and the garbage collection unit 31 may be implemented by hardware.

When the write data and the logical address of the write data is received from the cache control unit 9, the address translation unit 25 generates information relating the logical address of the write data to a physical address indicative of a position in the nonvolatile memory 24 in which the write data is stored, and registers the information to the address translation information 32.

In the present embodiment, the address translation unit 25 is implemented by the processor 22. However, the address translation unit 25 may be configured separately from the processor 22.

The address translation unit 25 translates addresses based on, for example, the table-form address translation information 32. Instead, addresses may be translated by key-value retrieval. For example, address translation can be implemented by means of key-value retrieval by using a logical address as a key and a physical address as a value.

The write unit 26 writes the write data to the position indicated by the physical address obtained by the address translation unit 25.

The valid/invalid generation unit 27 generates valid/invalid information 33 indicating whether each item of the data written to the nonvolatile memory 24 is valid data or invalid data based on, for example, the address translation information 32. Then, the valid/invalid generation unit 27 stores the valid/invalid information 33 in the memory 23.

The selection unit 28 selects a block to be subjected to garbage collection.

For example, the selection unit 28 may select a block having the oldest write time from blocks in the nonvolatile memory 24 as a block to be subjected to garbage collection.

For example, the selection unit 28 may select a block to be subjected to garbage collection at random from the blocks in the nonvolatile memory 24.

For example, the selection unit 28 may select a block having the largest amount of invalid data or having the amount of invalid data larger than a predetermined amount as a block to be subjected to garbage collection, based on the valid/invalid information 33.

For example, the selection unit 28 may select a block having the largest amount of invalid data and data to be deleted or having the amount of invalid data and data to be deleted larger than a predetermined amount as a block to be subjected to garbage collection, based on the valid/invalid information 33 and the deletion information 34.

The transmission unit 29 generates block information by deleting a logical address indicative of invalid data determined as being invalid by the valid/invalid information 33 from logical addresses indicative of data written to the block to be subjected to garbage collection. In other words, the block information includes information relating identification information of the block to be subjected to garbage collection to logical addresses indicative of valid data written to the block. The transmission unit 29 transmits the block information to the cache memory control unit 9.

The reception unit 30 receives the deletion information from the cache memory control unit 9 and stores the deletion information 34 in the nonvolatile memory 24.

The garbage collection unit 31 excludes invalid data and data to be deleted from the data written to the block to be subjected to garbage collection based on the valid/invalid information 33 and the deletion information 34 stored in the nonvolatile memory 24, and executes garbage collection only for valid data that is not data to be deleted.

Figure 2:
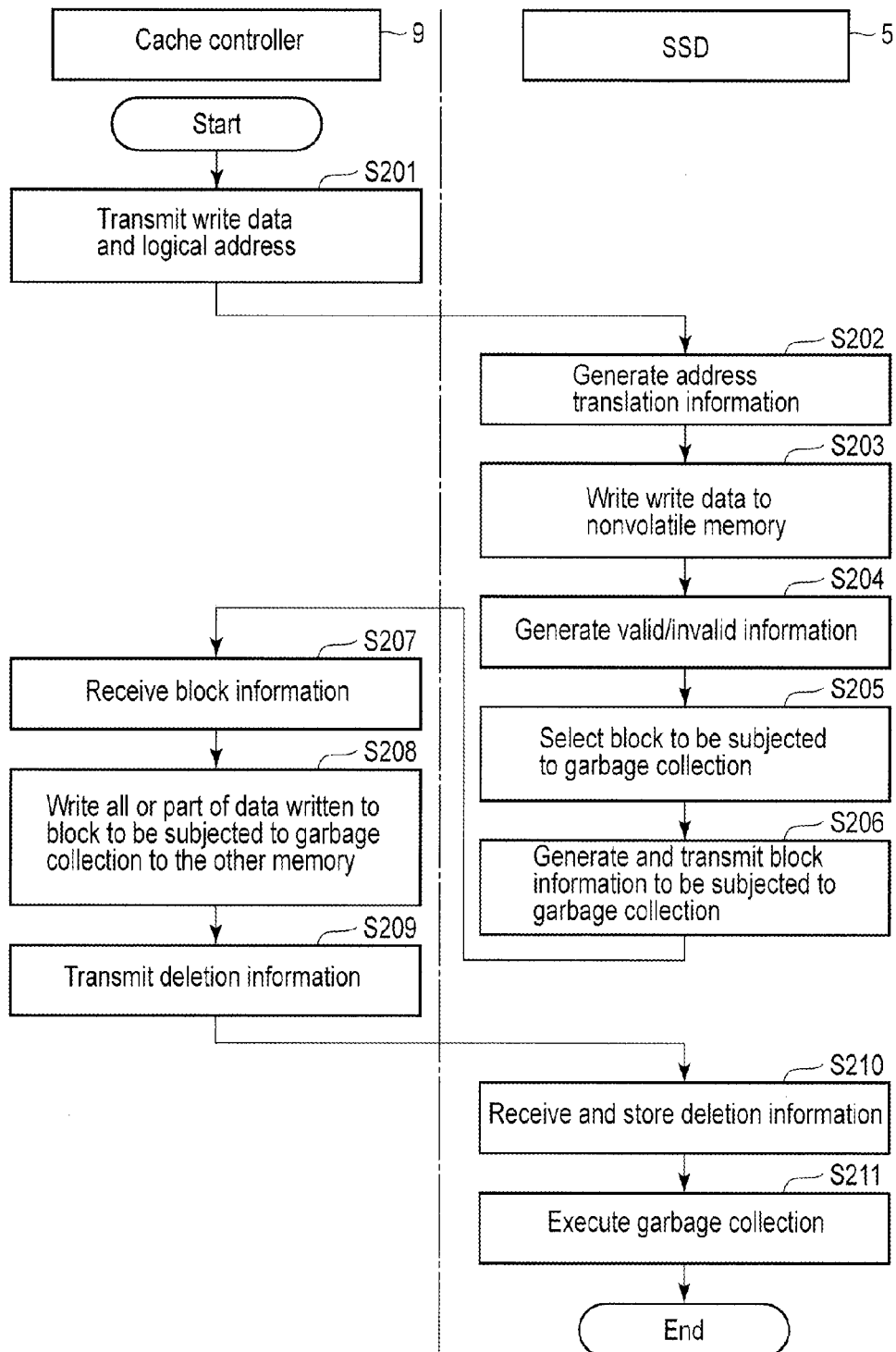
FIG. 2 is a flow chart showing an example of a process performed by the information processing system according to the first embodiment.

FIG. 2 is a flowchart showing an example of a process performed by the information processing system according to the present embodiment.

In step S201, the transmission unit 18 transmits write data and a logical address to the SSD 5.

In step S202, the address translation unit 25 receives the write data and the logical address and registers, to the address translation information 32, information relating the logical address of the write data to a physical address.

In step S203, the write unit 26 writes the write data to a position in the nonvolatile memory 24 indicated by the physical address.

In step S204, the valid/invalid generation unit 27 generates valid/invalid information 33 indicating whether each item of data written to the nonvolatile memory 24 is valid data or invalid data, and stores the valid/invalid information 33 in the memory 23.

In step S205, the selection unit 28 selects a block to be subjected to garbage collection.

In step S206, the transmission unit 29 generates block information by deleting a logical address indicative of invalid data indicated as being invalid by the valid/invalid information 33 from logical addresses indicative of data written to the block to be subjected to garbage collection, and transmits the block information to the cache control unit 9.

In step S207, the reception unit 19 receives the block information from the SSD 5.

In step S208, the write unit 20 writes all or a part of data indicated by the logical addresses included in the block information to a memory other than the nonvolatile memory 24 of the SSD 5, based on the block information received from the SSD 5 and the management information 61 to 64.

For example, the write unit 20 excludes a logical address indicative of data to be deleted in the case of receiving a delete command from the logical addresses included in the block information, and writes data indicated by the logical addresses to be maintained to the other memory.

In step S209, the transmission unit 21 transmits the deletion information including the logical address of data to be deleted to the SSD 5.

In step S210, the reception unit 30 receives the deletion information from the cache control unit 9 and stores the deletion information 34 in the memory 23.

In step S211, the garbage collection unit 31 excludes invalid data and data to be deleted data from the data written to the block to be subjected to garbage collection based on the valid/invalid information 33 and the deletion information 34, and executes garbage collection for valid data that is not data to be deleted.

In the above-described present embodiment, the cache control unit 9 can acquire information on data written to a block of the nonvolatile memory 24 from the SSD 5. The cache control unit 9 can thereby recognize a state of write of the data in the block of the nonvolatile memory 24. For example, in the present embodiment, whether the data written to the block of the nonvolatile memory 24 is valid data or invalid data and whether the data may be deleted can be recognized.

In the present embodiment, the SSD 5 includes the valid/invalid information 33 to determine whether the data is valid data or invalid data and the deletion information 34 to determine whether the data may be deleted or not. Whether or not to erase data written to a block to be subjected to garbage collection can be thereby determined when garbage collection is performed in the SSD 5. Therefore, an unnecessary write of data can be avoided and the life of the nonvolatile memory 24 can be increased.

In the present embodiment, the cache control unit 9 can prevent the deletion target data amongst the valid data indicated by the logical addresses included in the block information received from the SSD 5 from being transcribed from the nonvolatile memory 24 to the other memory. In the present embodiment, the SSD 5 can delete data that is not transcribed from the cache control unit 9 to the other memory (for example, invalid data or valid data that may be deleted) from the SSD 5.

In the above-described present embodiment, the block information related to the block to be erased is transmitted from the SSD 5 to the information processing device 17. However, the block information may include, for example, information relating each block in the nonvolatile memory 24 to identification information of data written to each block. The information processing device 17 can recognize the relationship of storage between the blocks and the data in the SSD 5 by receiving the relation information from the SSD 5.

[Second Embodiment]

A cache memory device including the nonvolatile cache memory 4 is described in the present embodiment.

Figure 3:
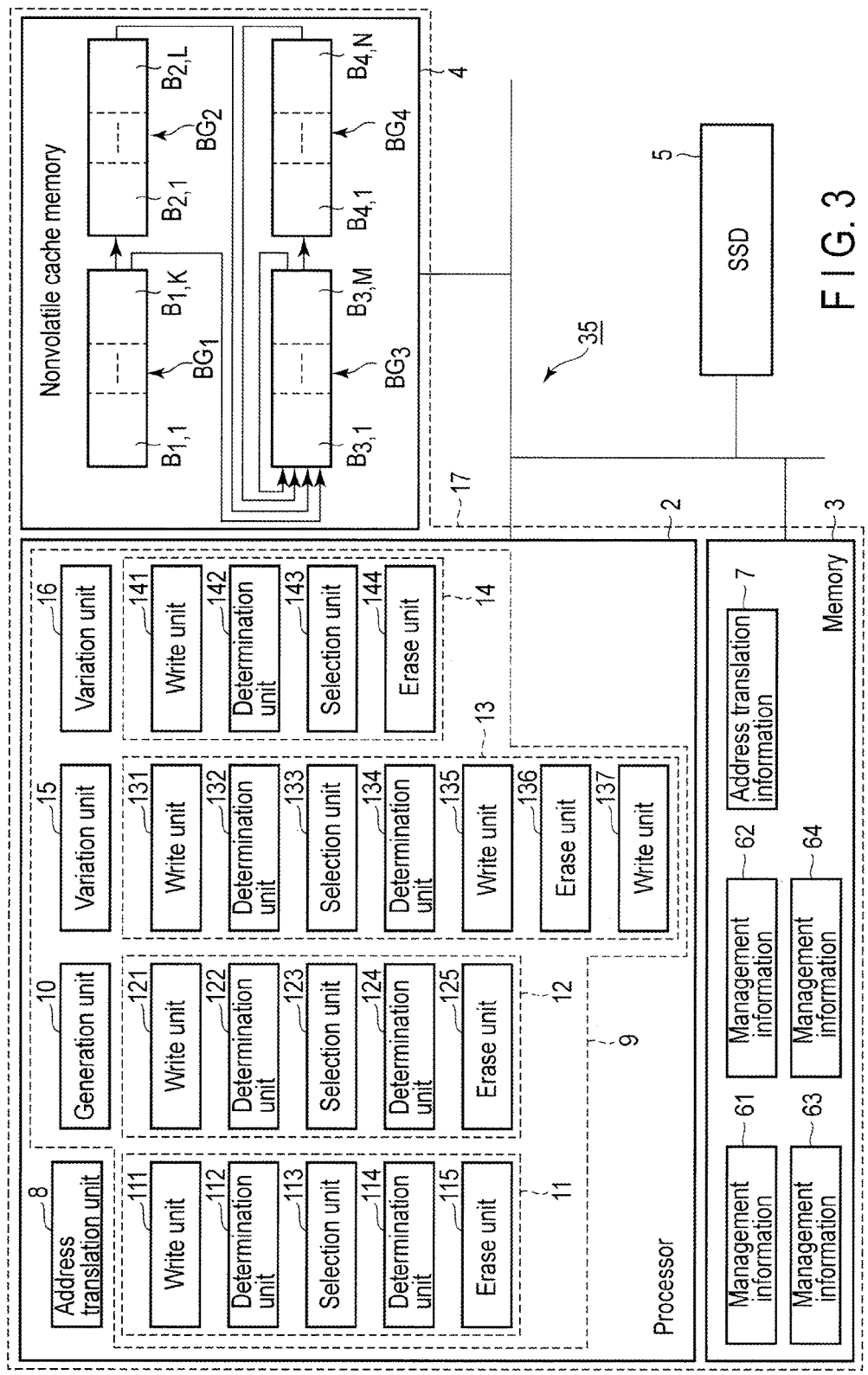
FIG. 3 is a block diagram showing a configuration example of an information processing system according to a second embodiment.

FIG. 3 is a block diagram showing a configuration example of the information processing device 35 according to the present embodiment.

The information processing device 17 includes a processor 2, a memory 3, and the nonvolatile cache memory 4.

The nonvolatile cache memory 4 includes block groups $BG_1$ to $BG_4$. The nonvolatile cache memory 4 has an access speed higher than that of the SSD 5. The block group (first group) $BG_1$ includes blocks (first erase unit areas) $B_{1,1}$ to $B_{1,K}$. The block group $BG_1$ stores data accessed by the processor 2 (i.e., data used by the processor 2).

In the present embodiment, when the block group $BG_1$ satisfies an erase condition (first erase condition), a block to be erased (block to be discarded or pushed out) (first area to be erased) is selected from the blocks $B_{1,1}$ to $B_{1,K}$ in the block group $BG_1$ based on first-in first-out (FIFO).

For example, the erase condition is satisfied when data amount of each of the blocks $B_{1,1}$ to $B_{1,K}$ of the block group $BG_1$ exceeds a predetermined value. For example, the erase condition may be satisfied when the number of pages written to each of the blocks $B_{1,1}$ to $B_{1,K}$ of the block group $BG_1$ exceeds a predetermined number.

Data written to the block to be erased selected from the blocks $B_{1,1}$ to $B_{1,K}$ based on FIFO is written to a block group $BG_2$ when the data is in a first low-use state (for example, when the data is accessed for less than a set first number of times or at less than a set first frequency). In contrast, the data written to the block to be erased selected from the blocks $B_{1,1}$ to $B_{1,K}$ is written to a block group $BG_2$ when the data is in a first high-use state (for example, when the data is accessed for the first number of times or more or at the first frequency or more). The data written to the block to be erased selected from the blocks $B_{1,1}$ to $B_{1,K}$ is erased (i.e., discarded or pushed out) per block.

The block group (second group) $BG_2$ includes blocks (second erase unit areas) $B_{2,1}$ to $B_{2,L}$. The block group $BG_2$ stores the data in the first low-use state of the data written to the block to be erased selected from the block group $BG_1$.

In the present embodiment, when the block group $BG_2$ satisfies an erase condition (third erase condition), a block to be erased (third area to be erased) is selected from the blocks $B_{2,1}$ to $B_{2,L}$ in the block group $BG_2$ based on FIFO.

Data written to the block to be erased selected from the blocks $B_{2,1}$ to $B_{2,L}$ by FIFO is erased when the data is in a third low-use state (for example, when the data is accessed for less than a set third number of times or at less than a set third frequency). In contrast, the data written to the block to be erased selected from the blocks $B_{2,1}$ to $B_{2,L}$ is written to a block group $BG_3$ when the data is in a third high-use state (for example, when the data is accessed for the third number of times or more or at the third frequency or more). Then, the data written to the block to be erased selected from the blocks $B_{2,1}$ to $B_{2,L}$ is erased per block.

The block group (third group) $BG_3$ includes blocks (third erase unit areas) $B_{3,1}$ to $B_{3,M}$. The block group $BG_3$ stores the data in the first low-use state of the data written to the block to be erased selected from the block group $BG_1$. The block group $BG_3$ also stores the data in the third high-use state of the data written to the block to be erased selected from the block group $BG_2$.

In the present embodiment, when the block group $BG_3$ satisfies an erase condition (second erase condition), a block to be erased (second area to be erased) is selected from the blocks $B_{3,1}$ to $B_{3,M}$ in the block group $BG_3$ based on FIFO.

Data written to the block to be erased selected from the blocks $B_{3,1}$ to $B_{3,M}$ by FIFO is written to the block group $BG_4$ when the data is in a second low-use state (for example, when the data is accessed for less than a set second number of times or at less than a set second frequency). In contrast, the data written to the block to be erased selected from the blocks $B_{3,1}$ to $B_{3,M}$ is written to the other block in the block group $BG_3$ again when the data is in a second high-use state (for example, when the data is accessed for the second number of times or more or at the second frequency or more). Then, the data written to the block to be erased selected from the blocks $B_{3,1}$ to $B_{3,M}$ is erased per block.

The block group (fourth group) $BG_4$ includes blocks (fourth erase unit areas) $B_{4,1}$ to $B_{4,N}$. The block group $BG_4$ stores the data in the second low-use state of the data written to the block to be erased selected from the block group $BG_3$.

In the present embodiment, when the block group $BG_4$ satisfies an erase condition (fourth erase condition), a block to be erased (fourth area to be erased) is selected from the blocks $B_{4,1}$ to $B_{4,N}$ in the block group $BG_4$ based on FIFO.

Data written to the block to be erased selected from the blocks $B_{4,1}$ to $B_{4,N}$ by FIFO is erased.

In the present embodiment, FIFO is used as a method for selecting a block to be erased from each of the block groups $BG_1$ to $BG_4$. By selecting the block to be erased by FIFO, erasure is sequentially performed in each of the block groups $BG_1$ to $BG_4$ from a block having the oldest write time and write order. However, the block to be erased may be selected, for example, at random, or based on least recently used (LRU) or least frequently used (LFU). For example, the management information 61 to 64 includes identification information of the data, information indicating whether the data is data to be deleted or not, and state-of-use information of the data. A block having the largest amount of invalid data or a block having an amount of invalid data larger than a predetermined amount may be selected as the block to be erased based on the management information 61 to 64. For example, a block having the largest amount of invalid data and data to be deleted (deletion target data) or a block having an amount of invalid data and data to be deleted larger than a predetermined amount may be selected as the block to be erased based on the management information 61 to 64.

In the present embodiment, the cache control unit 9 can recognize identification information (for example, a logical address provided from the host (for example, Logical Block Addressing)) of cached data, a position to which the data is written and a state of use of the data based on the management information 61 to 64 and the address translation information 7. For example, the cache control unit 9 can select data cached to each of the block groups $BG_1$ to $BG_4$ and a block erased by FIFO based on the management information 61 to 64 and the address translation information 7.

The processor 2 functions as an address translation unit 8 and a cache control unit 9 by executing a program stored in a memory of the processor 2, the memory 3, the nonvolatile cache memory 4 or the SSD 5.

In the present embodiment, the program to cause the processor 2 to function as the address translation unit 8 and the cache control unit 9 may be, for example, the OS, middleware or firmware. In the present embodiment, all or a part of the address translation unit 8 or all or a part of the cache control unit 9 may be implemented by hardware.

The address translation unit 8 generates information relating a logical address of write data to a physical address indicative of a position in the nonvolatile cache memory 4 in which the write data is stored, and registers the generated information to the address translation information 7.

When a logical address of read data is received from the processor 2, the address translation unit 8 translates the logical address to the physical address based on the address translation information 7.

The cache control unit 9 includes a generation unit 10, control units 11 to 14 and variation units 15 and 16.

The generation unit 10 generates management information 61 to 64 corresponding to the block groups $BG_1$ to $BG_4$ in the nonvolatile cache memory 4, and writes the management information 61 to 64 to the memory 3.

The control units 11 to 14 control write of data and erase of block for the block groups $BG_1$ to $BG_4$, respectively.

The control unit 11 includes a write unit 111, a determination unit 112, a selection unit 113, a determination unit 114 and an erase unit 115.

The write unit (first write unit) 111 writes data accessed by the processor 2 to the block group $BG_1$.

The determination unit (first determination unit) 112 determines whether the block group $BG_1$ satisfies the erase condition (first erase condition) or not.

When the block group $BG_1$ satisfies the erase condition, the selection unit (first selection unit) 113 selects a block to be erased (first area to be erased) from the block group $BG_1$.

The determination unit (second determination unit) 114 determines whether each item of data written to the block to be erased is in the first high-use state or the first low-use state and whether each item of the data is data to be deleted, based on the management information 61.

The erase unit (first erase unit) 115 erases the block to be erased when each data item written to the block to be erased can be discarded because each data item is written to the block group $BG_2$ or $BG_3$ or data to be deleted.

The control unit 12 includes a write unit 121, a determination unit 122, a selection unit 123, a determination unit 124 and an erase unit 125.

When the determination unit 114 determines that the data written to the block to be erased of the block group $BG_1$ is in the first low-use state and is not data to be deleted, the write unit (second write unit) 121 writes the data to the block group $BG_2$.

The determination unit (fifth determination unit) 122 determines whether the block group $BG_2$ satisfies the erase condition (third erase condition) or not.

When the block group $BG_2$ satisfies the erase condition, the selection unit (third selection unit) 123 selects a block to be erased (third area to be erased) from the block group $BG_2$.

The determination unit 124 determines whether each item of data written to the block to be erased is in the third high-use state or the third low-use state and whether each item of the data is data to be deleted, based on the management information 62.

When data that is written to the block to be erased, is in the third high-use state and is not data to be deleted is written to the block group $BG_3$, the erase unit (second erase unit) 125 erases the data written to the block to be erased.

The control unit 13 includes a write unit 131, a determination unit 132, a selection unit 133, a determination unit 134, a write unit 135, an erase unit 136 and a write unit 137.

When the determination unit 114 determines that data written to the block to be erased of the block group $BG_1$ is in the first high-use state and is not data to be deleted, the write unit (third write unit) 131 writes the data to the block group $BG_3$.

When data written to the block group $BG_2$ is in the third high-use state and is not data to be deleted, the write unit (sixth write unit) 137 writes the data to the block group $BG_3$. For example, when the data written to the block group $BG_2$ is data to be accessed by the processor 2, the write unit 137 may write the data to be accessed of the block group $BG_2$ to the block group $BG_3$.

The determination unit (third determination unit) 132 determines whether the block group $BG_3$ satisfies the erase condition (second erase condition) or not.

When the block group $BG_3$ satisfies the erase condition, the selection unit (second selection unit) 133 selects a block to be erased (second area to be erased) from the block group $BG_3$.

The determination unit (fourth determination unit) 134 determines whether each item of data written to the block to be erased is in the second high-use state or the second low-use state and whether each item of the data is data to be deleted, based on the management information 63.

When the data written to the block to be erased of the block group $BG_3$ is determined to be in the second high-use state and be not data to be deleted, the write unit (fifth write unit) 135 writes the data to the other writable block in the block group $BG_3$ again.

The erase unit (third erase unit) 136 erases the block to be erased when each item of the data written to the block to be erased can be discarded because each data item is written to the block group $BG_4$, written to the block group $BG_3$ again, or data to be deleted.

The control unit 14 includes a write unit 141, a determination unit 142, a selection unit 143 and an erase unit 144.

When the determination unit 134 determines that data written to the block to be erased of the block group $BG_3$ is in the second low-use state and is not data to be deleted, the write unit (fourth write unit) 141 writes the data to the block group $BG_4$.

The determination unit (sixth determination unit) 142 determines whether the block group $BG_4$ satisfies the erase condition (fourth erase condition) or not.

When the block group $BG_4$ satisfies the erase condition (fourth erase condition), the selection unit (fourth selection unit) 143 selects a block to be erased (fourth area to be erased) from the block group $BG_4$.

The erase unit (fourth erase unit) 144 erases data written to the block to be erased of the block group $BG_4$.

When data written to the block group $BG_2$ reaches the third high-use state, the variation unit (first variation unit) 15 increases the number of blocks included in the block group $BG_1$ and reduces the number of blocks included in the block group $BG_3$. For example, when the data written to the block group $BG_2$ is accessed by the processor 2, the variation unit 15 increases the number of blocks included in the block group $BG_1$ and reduces the number of blocks included in the block group $BG_3$.

When data written to the block group $BG_4$ reaches the fourth high-use state, the variation unit (second variation unit) 16 increases the number of blocks included in the block group $BG_3$ and reduces the number of blocks included in the block group $BG_1$. For example, when the data written to the block group $BG_4$ is accessed by the processor 2, the variation unit 16 increases the number of blocks included in the block group $BG_3$ and reduces the number of blocks included in the block group $BG_1$.

FIG. 4 is a flowchart showing an example of first cache control according to the present embodiment. FIG. 4 exemplarily shows a process in which data is written to the block group $BG_1$, the data is written to the block group $BG_2$ or $BG_3$ and a block to be erased in the block group $BG_1$ is erased.

In step S401, the write unit 111 writes data accessed by the processor 2 to the block group $BG_1$.

In step 402, the determination unit 112 determines whether the block group $BG_1$ satisfies the erase condition or not.

When the block group $BG_1$ does not satisfy the erase condition, the process proceeds to step S406.

When the block group $BG_1$ satisfies the erase condition, the selection unit 113 selects a block to be erased from the block group $BG_1$ in step S403.

In step S404, the determination unit 114 determines whether each item of data written to the block to be erased is in the first high-use state or the first low-use state and whether each item of the data is data to be erased (deletion target data), based on the management information 61.

When the data item is in the first low-use state and the data is not data to be deleted (non-deletion target data), the write unit 121 writes the data item to the block group $BG_2$ in step S501.

When the data item is in the first high-use state and is not data to be deleted, the write unit 131 writes the data item to the block group $BG_3$ in step S601.

In step S405, the erase unit 115 erases the block to be erased when each item of the data written to the block to be erased can be discarded because each item of the data is written to the block group $BG_2$ or block group $BG_3$, or data to be deleted.

In step S406, the cache control unit 9 determines whether or not to end the process.

When the cache control unit 9 does not end the process, the process returns to step S401.

When the cache control unit 9 ends the process, the process is ended.

FIG. 5 is a flowchart showing an example of second cache control according to the present embodiment. FIG. 5 exemplarily shows a process in which data is written to the block group $BG_2$ and a block to be erased in the block group $BG_2$ is erased.

When the data written to the block to be erased of the block group $BG_1$ is determined to be in the first low-use state and be not data to be deleted in step S404, the write unit 121 writes the data to the block group $BG_2$ in step S501.

In step S502, the determination unit 122 determines whether the block group $BG_2$ satisfies the erase condition or not.

When the block group $BG_2$ does not satisfy the erase condition, the process proceeds to step S506.

When the block group $BG_2$ satisfies the erase condition, the selection unit 123 selects a block to be erased from the block group $BG_2$ in step S503.

In step S504, the determination unit 124 determines whether each item of data written to the block to be erased is in the third high-use state or the third low-use state and whether each item of the data is data to be deleted, based on the management information 62.

When the data item is in the third low-use state or is data to be deleted, the process proceeds to step S505.

When the data item is in the third high-use state and is not data to be deleted, the write unit 137 writes the data item to the block group $BG_3$ in step S601.

In step S505, the erase unit 125 erases the data written to the block to be erased of the block group $BG_2$.

In step S506, the cache control unit 9 determines whether or not to end the process.

When the cache control unit 9 does not end the process, the process returns to step S501.

When the cache control unit 9 ends the process, the process is ended.

FIG. 6 is a flowchart showing an example of third cache control according to the present embodiment.

FIG. 6 exemplarily shows a process from writing data to the block group $BG_3$ to erasing the data in the block group $BG_3$.

When the data written to the block to be erased of the block group $BG_1$ is determined to be in the first high-use state and be not data to be deleted in step S404, the write unit 131 writes the data to the block group $BG_3$ in step S601. When the data written to the block group $BG_2$ is determined to be in the third high-use state (for example, the data is accessed by the processor 2) and be not data to be deleted in step S304, the write unit 137 writes the data of the block group $BG_2$ to the block group $BG_3$.

In step S602, the determination unit 132 determines whether the block group $BG_3$ satisfies the erase condition or not.

When the block group $BG_3$ does not satisfy the erase condition, the process proceeds to step S607.

When the block group $BG_3$ satisfies the erase condition, the selection unit 133 selects a block to be erased from the block group $BG_3$ in step S603.

In step S604, the determination unit 134 determines whether each item of data written to the block to be erased is in the second high-use state or the second low-use state and whether each item of the data is data to be deleted, based on the management information 63.

When the data item is in the second low-use state and is not data to be deleted, the write unit 141 writes the data to the block group $BG_4$ in step S701.

When the data is in the second high-use state and is not data to be deleted, the write unit 135 writes the data written to the block to be erased of the block group $BG_3$ to the other block in the block group $BG_3$ again in step S605.

In step S606, the erase unit 136 erases the block to be erased when each item of the data written to the block to be erased can be discarded because each data item is written to the block group $BG_4$, written to the block group $BG_3$ again, or data to be deleted.

In step S607, the cache control unit 9 determines whether or not to end the process.

When the cache control unit 9 does not end the process, the process returns to step S601.

When the cache control unit 9 ends the process, the process is ended.

FIG. 7 is a flowchart showing an example of fourth cache control according to the present embodiment. FIG. 7 exemplarily shows a process in which data is written to the block group $BG_4$ and the data in the block group $BG_4$ is erased.

When the data written to the block to be erased of the block group $BG_3$ is determined to be in the second low state and be not data to be deleted in step S604, the write unit 141 writes the data to the block group $BG_4$ in step S701.

In step S702, the determination unit 142 determines whether the block group $BG_4$ satisfies the erase condition or not.

When the block group $BG_4$ does not satisfy the erase condition, the process proceeds to step S705.

When the block group $BG_4$ satisfies the erase condition, the selection unit 143 selects a block to be erased from the block group $BG_4$ in step S703.

In step S704, the erase unit 144 erases the data written to the block to be erased in the block group $BG_4$.

In step S705, the cache control unit 9 determines whether or not to end the process.

When the cache control unit 9 does not end the process, the process returns to step S701.

When the cache control unit 9 ends the process, the process is ended. In the block group $BG_1$ of the present embodiment, for example, data is first sequentially written to the block $B_{1,1}$, next sequentially written to the block $B_{1,2}$, and then similarly written to the blocks $B_{1,3}$ to $B_{1,K}$. When a data amount of the blocks $B_{1,1}$ to $B_{1,K}$ included in the block group $BG_1$ exceeds a predetermined data amount, the block $B_{1,1}$ in which writing is first completed is erased by FIFO and data is sequentially written to the erased block $B_{1,1}$ again. After the writing to the block $B_{1,1}$ is completed, the block $B_{1,2}$ is erased by FIFO. Then, data is sequentially written to the erased block $B_{1,2}$ again. The same control is repeated.

In the block group $BG_1$, whether the data written to the block to be erased in the block group $BG_1$ is accessed, for example, for less than the first number of times or at less than the first frequency is determined based on the management information 61. When the data written to the block to be erased in the block group $BG_1$ is accessed for less than the first number of times or at less than the first frequency, the block group $BG_2$ is selected as a destination of writing of the data.

In contrast, when the data written to the block to be erased in the block group $BG_1$ is accessed for the first number of times or more or at the first frequency or more, the block group $BG_3$ is selected as a destination of writing of the data.

When the data written to the block to be erased in the block group $BG_1$ is data to be deleted, the data is discarded.

In the block group $BG_2$ of the present embodiment, the data in the first low-use state from the block group $BG_1$ is first sequentially written to the block $B_{2,1}$, next sequentially written to the block $B_{2,2}$, and then similarly written to the blocks $B_{2,3}$ to $B_{2,L}$. When a data amount of the blocks $B_{2,1}$ to $B_{2,L}$ included in the block group $BG_2$ exceeds a predetermined data amount, the block $B_{2,1}$ in which writing is first completed is erased by FIFO and data is sequentially written to the erased block $B_{2,1}$ again. After the writing to the block $B_{2,1}$ is completed, the block $B_{2,2}$ is erased by FIFO. Then, data is sequentially written to the erased block $B_{2,2}$. The same control is repeated.

In the block group $BG_2$, whether the data written to the block to be erased in the block group $BG_2$ is accessed, for example, for less than the third number of times or at less than the third frequency is determined based on the management information 62. When the data written to the block to be erased in the block group $BG_2$ is accessed for less than the third number of times or at less than the third frequency, the data is erased.

In contrast, when the data written to the block to be erased in the block group $BG_2$ is accessed for the third number of times or more or at the third frequency or more, the block group $BG_3$ is selected as a destination of writing of the data.

When the data written to the block to be erased in the block group $BG_2$ is data to be deleted, the data is discarded.

In the block group $BG_3$ of the present embodiment, the data in the first high-use state from the block group $BG_1$, the data in the third high-use state from the block group $BG_2$ or the re-write data from the block group $BG_3$ is first sequentially written to the block $B_{3,1}$, next sequentially written to the block $B_{3,2}$, and then similarly written to the blocks $B_{3,3}$ to $B_{3,M}$. When a data amount of the blocks $B_{3,1}$ to $B_{3,M}$ included in the block group $BG_3$ exceeds a predetermined data amount, the block $B_{3,1}$ in which writing is first completed is erased by FIFO and data is sequentially written to the erased block $B_{3,1}$ again. After the writing to the block $B_{3,1}$ is completed, the block $B_{3,2}$ is erased by FIFO. Then, data is sequentially written to the erased block $B_{3,2}$ again. The same control is repeated.

In the block group $BG_3$, whether the data written to the block to be erased in the block group $BG_3$ is accessed, for example, for less than the second number of times or at less than the second frequency is determined based on the management information 63. When the data written to the block to be erased in the block group $BG_3$ is accessed for less than the second number of times or at less than the second frequency, the block group $BG_4$ is selected as a destination of writing of the data.

In contrast, when the data written to the block to be erased in the block group $BG_3$ is accessed for the second number of times or more or at the second frequency or more, the data is written to the block group $BG_3$ again.

When the data written to the block to be erased in the block group $BG_3$ is data to be deleted, the data is discarded.

In the block group $BG_4$ of the present embodiment, the data in the second low-use state from the block group $BG_3$ is first sequentially written to the block $B_{4,1}$, next sequentially written to the block $B_{4,2}$, and then similarly written to the blocks $B_{4,3}$ to $B_{4,N}$. When a data amount of the blocks $B_{4,1}$ to $B_{4,N}$ included in the block group $BG_4$ exceeds a predetermined data amount, the block $B_{4,1}$ in which writing is first completed is erased by FIFO and data is sequentially written to the erased block $B_{4,1}$ again. After the writing to the block $B_{4,1}$ is completed, the block $B_{4,2}$ is erased by FIFO. Then, data is sequentially written to the erased block $B_{4,2}$. The same control is repeated.

In the present embodiment, the control unit 14 may determine whether data written to a block to be erased of the block group $BG_4$ is in a fifth high-use state or not. When the data written to the block to be erased of the block group $BG_4$ is determined to be in the fifth high-use state, the control unit 13 may write the data to a writable destination block of the block group $BG_3$ in respect of maintaining the data in the nonvolatile cache memory 4. In this case, the processor 2 may reduce a size of the block group $BG_1$.

In the present embodiment, data is managed based on the four block groups $BG_1$ to $BG_4$.

For example, first data (once-accessed data) once accessed by the processor 2 is managed in the block group $BG_1$.

For example, if second data in the block group $BG_1$ is accessed twice or more by the processor 2 and pushed out from the block group $BG_1$ based on FIFO, the second data is moved from the block group $BG_1$ to the block group $BG_3$.

It should be noted that the size of the block group $BG_1$ is larger than the size of the block group $BG_3$ in the present embodiment.

For example, when third data in the block group $BG_1$ is pushed out from the block group $BG_1$ based on FIFO without being accessed by the processor 2, the third data is moved from the block group $BG_1$ to the block group $BG_2$.

For example, if fourth data in the block group $BG_3$ is purged from the block group $BG_3$ based on FIFO without being accessed by the processor 2, the fourth data is moved from the block group $BG_3$ to the block group $BG_4$.

For example, in the block groups $BG_2$ and $BG_4$, metadata may be cached instead of caching data. The metadata includes information related to the data. In other words, the metadata is highly abstract and additional data on the data and is attached to the data.

In the present embodiment, for example, when fifth data is stored in the block group $BG_1$, sixth data in the block group $BG_2$ may be pushed out based on FIFO.

For example, when seventh data in the block group $BG_1$ is accessed and pushed out from the block group $BG_1$ based on FIFO, the seventh data may be moved from the block group $BG_1$ to the block group $BG_3$, eighth data in the block group $BG_3$ may be moved from the block group $BG_3$ to the block group $BG_4$ based on FIFO and ninth data in the block group $BG_4$ may be pushed out from the block group $BG_4$ based on FIFO.

For example, when tenth data in the block group $BG_2$ is accessed, the size of the block group $BG_1$ is increased. If the size of the block group $BG_1$ is increased, eleventh data in the block group $BG_3$ is moved to the block group $BG_4$ based on FIFO.

For example, when twelfth data in the block group $BG_4$ is accessed and push out from the block group $BG_4$ based on FIFO, the twelfth data is moved to the block group $BG_3$ and the size of the block group $BG_1$ is reduced.

In the above-described present embodiment, a maintaining determination determines whether or not to maintain the data for a unit of block, a transfer writing writes the data of block to be maintained to a destination block, and data written to the nonvolatile cache memory 4 is erased per block.

In the present embodiment, an effective cache capacity can be increased, a hit rate of the nonvolatile cache memory 4 can be raised and a speed of the information processing device 17 can be increased.

In the present embodiment, a decrease in performance can be avoided without performing garbage collection for the nonvolatile cache memory 4. Since garbage collection is not necessary, the number of writes to the nonvolatile cache memory 4 can be reduced and the life of the nonvolatile cache memory 4 can be increased. Furthermore, since garbage collection is not necessary, provisioning areas do not need to be secured. Therefore, a data capacity available as a cache memory can be increased and usage efficiency can be improved.

For example, when the nonvolatile memory is used as a cache memory and data is discarded regardless of the boundaries of blocks, garbage collection may be frequently performed to move valid data in a block of the nonvolatile memory to another block. In the present embodiment, garbage collection does not need to be performed in the nonvolatile cache memory 4. Therefore, as described above, the life of the nonvolatile cache memory 4 can be increased in the present embodiment.

[Third Embodiment]

In the present embodiment, the information processing system 35 including the information processing system 17 and SSD 5 explained in the first and second embodiments are further explained in detail.

Figure 8:
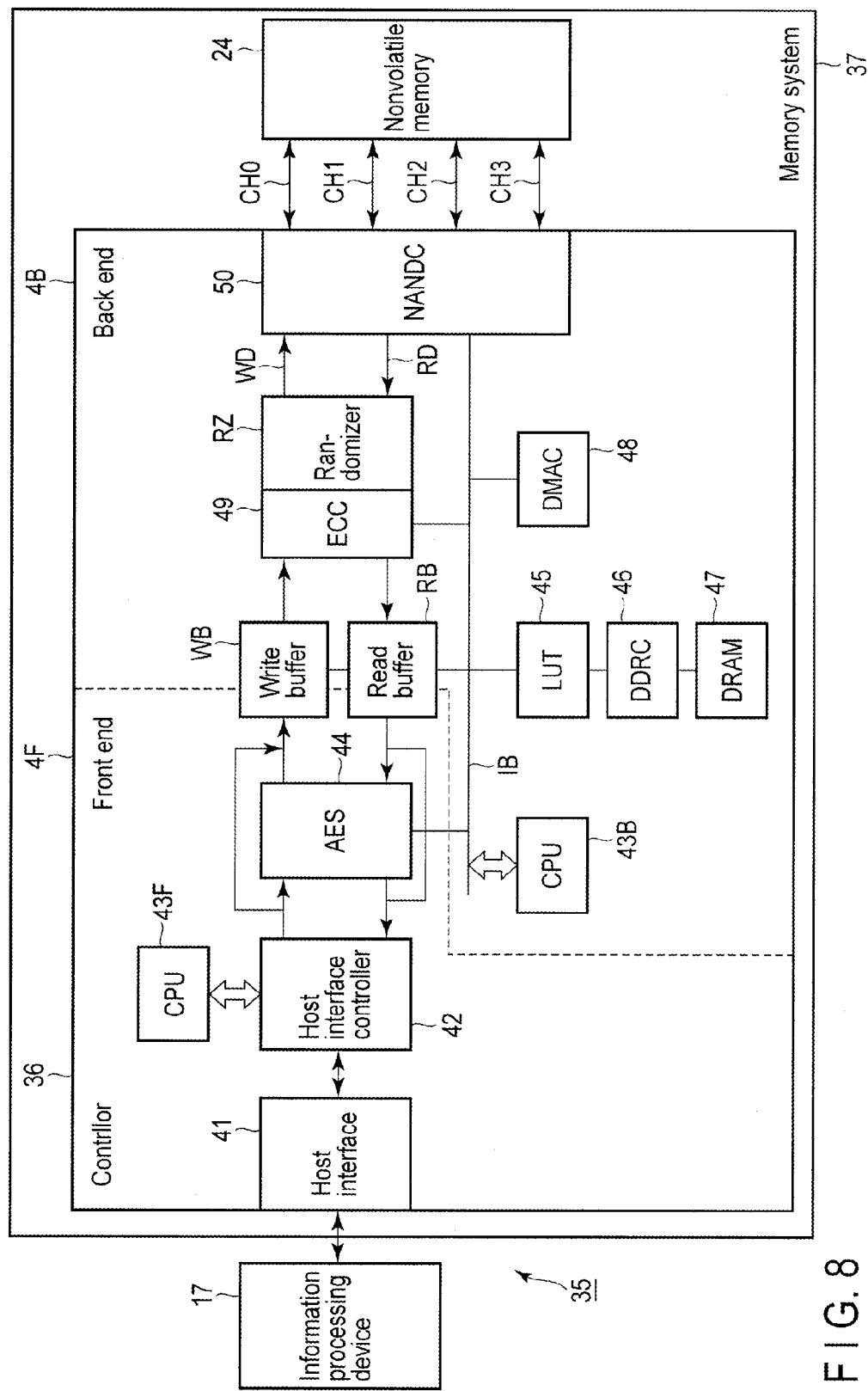
FIG. 8 is a block diagram showing an example of a detail configuration of an information processing system according to a third embodiment.

FIG. 8 is a block diagram showing of an example of a detail structure of the information processing system 35 according to the present embodiment.

The information processing system 35 includes the information processing device 17 and a memory system 37.

The SSD 5 according to the first and second embodiments corresponds to the memory system 37.

The processor 22 of the SSD5 corresponds to a CPU 43B.

The address translation information 32 corresponds to an LUT (Look Up Table) 45.

The memory 23 corresponds to a DRAM 47.

The information processing device 17 functions as a host device.

A controller 36 of the memory system 37 includes a front end 4F and a back end 4B.

The front end (host communication unit) 4F includes a host interface 41, host interface controller 42, encode/decode unit (Advanced Encryption Standard (AES)) 44, and CPU 43F.

The host interface 41 communicates with the information processing device 17 to exchange requests (write command, read command, erase command), LEA, and data.

The host interface controller (control unit) 42 controls the communication of the host interface 41 based on the control of the CPU 43F.

The encode/decode unit 44 encodes the write data (plaintext) transmitted from the host interface controller 42 in a data write operation. The encode/decode unit 44 decodes encoded read data transmitted from the read buffer RB of the back end 4B in a data read operation. Note that the transmission of the write data and read data can be performed without using the encode/decode unit 44 as occasion demands.

The CPU 43F controls the above components 41, 42, and 44 of the front end 4F to control the whole function of the front end 4F.

The back end (memory communication unit) 4B includes a write buffer WB, read buffer RE, LUT 45, DDRC 46, DRAM 47, DMAC 48, ECC 49, randomizer RZ, NANDC 50, and CPU 43B.

The write buffer (write data transfer unit) WB stores the write data transmitted from the information processing device 17 temporarily. Specifically, the write buffer WB temporarily stores the data until it reaches to a predetermined data size suitable for the nonvolatile memory 24.

The read buffer (read data transfer unit) RB stores the read data read from the nonvolatile memory 24 temporarily. Specifically, the read buffer RB rearranges the read data to be the order suitable for the information processing device 17 (the order of the logical address LBA designated by the information processing device 17).

The LUT 45 is a data to translate the logical address an LBA into a physical address PBA (Physical Block Addressing).

The DDRC 46 controls double data rate (DDR) in the DRAM 47.

The DRAM 47 is a nonvolatile memory which stores, for example, the LUT 45.

The direct memory access controller (DMAC) 48 transfers the write data and the read data through an internal bus IB. In FIG. 8, only a single DMAC 48 is shown; however, the controller 36 may include two or more DMACs 48. The DMAC 48 may be set in various positions inside the controller 36.

The ECC (error correction unit) 49 adds an error correction code (ECC) to the write data transmitted from the write buffer WB. When the read data is transmitted to the read buffer RB, the ECC 49, if necessary, corrects the read data read from the nonvolatile memory 24 using the added ECC.

The randomizer RZ (or scrambler) disperses the write data in such a manner that the write data are not biased in a certain page or in a word line direction of the nonvolatile memory 24 in the data write operation. By dispersing the write data in this manner, the number of write can be standardized and the cell life of the memory cell MC of the nonvolatile memory 24 can be prolonged. Therefore, the reliability of the nonvolatile memory 24 can be improved. Furthermore, the read data read from the nonvolatile memory 24 passes through the randomizer RZ in the data read operation.

The NAND controller (NANDC) 50 uses a plurality of channels (four channels CH0 to CH3 are shown in the Figure) to access the nonvolatile memory 24 in parallel in order to satisfy a demand for a certain speed.

The CPU 43B controls each component above (45 to 50, and RZ) of the back end 4B to control the whole function of the back end 4B.

Note that the structure of the controller 36 is an example and no limitation is intended thereby.

FIG. 9 is a perspective view showing an example of a storage system according to the present embodiment.

A storage system 100 includes the memory system 37 as an SSD.

The memory system 37 is, for example, a relatively small module of which external size will be approximately 20 mm×30 mm. Note that the size and scale of the memory system 37 is not limited thereto and may be changed into various sizes arbitrarily.

Furthermore, the memory system 37 may be applicable to the information processing device 17 as a server used in a data center or a cloud computing system employed in a company (enterprise) or the like. Thus, the memory system 37 may be an enterprise SSD (eSSD).

The memory system 37 includes a plurality of connectors (for example, slots) 38 opening upwardly, for example. Each connector 38 is a serial attached SCSI (SAS) connector or the like. With the SAS connector, a high speed mutual communication can be established between the information processing device 17 and each memory system 37 via a dual port of 6 Gbps. Note that, the connector 38 may be a PCI express (PCIe) or NVM express (NVMe).

A plurality of memory systems 37 are individually attached to the connectors 38 of the information processing device 17 and supported in such an arrangement that they stand in an approximately vertical direction. Using this structure, a plurality of memory systems 37 can be mounted collectively in a compact size, and the memory systems 37 can be miniaturized. Furthermore, the shape of each memory system 37 of the present embodiment is 2.5 inch small form factor (SFF). With this shape, the memory system 37 can be compatible with an enterprise HDD (eHDD) and the easy system compatibility with the eHDD can be achieved.

Note that the memory system 37 is not limited to the use in an enterprise HDD. For example, the memory system 37 can be used as a memory medium of a consumer electronic device such as a notebook portable computer or a tablet terminal.

As can be understood from the above, the information processing system 35 and the storage system 100 having the structure of the present embodiment can achieve a mass storage advantage with the same advantages of the second embodiment.

The structure of the memory system 37 according to the present embodiment may be applied to the information processing device 17 according to the first embodiment. For example, the processor 2 according to the first embodiment may correspond to the CPU43B. The address translation information 7 may correspond to the LUT 45. The memory 3 corresponds to the DRAM 47. The nonvolatile cache memory 4 may correspond to the nonvolatile memory 24.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device communicating with an information processing device, the memory device comprising:
   a nonvolatile memory including a plurality of erase unit areas, each of the erase unit areas including a plurality of write unit areas;
   an address translation unit which generates address translation information relating a logical address of write data written to the nonvolatile memory to a physical address indicative of a write position of the write data in the nonvolatile memory;
   a write unit which writes the write data to the write position indicated by the physical address;
   a generation unit which generates, based on the address translation information, valid/invalid information indicating whether data written to the plurality of erase unit areas is valid data or invalid data, the valid/invalid information including information relating identification information of the erase unit area to a logical address indicative of the valid data or the invalid data written to the erase unit area;
   a selection unit which selects an erase unit area to be subjected to garbage collection from the plurality of erase unit areas;
   a transmission unit which generates, based on the valid/invalid information, area information including a logical address indicative of valid data written to the erase unit area to be subjected to garbage collection, and transmits the area information to the information processing device;
   a reception unit which receives deletion information including a logical address indicative of data to be deleted amongst the valid data in the erase unit area to be subjected to garbage collection from the information processing device; and
   a garbage collection unit which performs garbage collection of the valid data written to the erase unit area to be subjected to garbage collection excluding the data to be deleted.

2. The memory device according to claim 1, wherein
   the valid data is updated data in a case where update of the data written to the nonvolatile memory is performed, and
   the invalid data is data which is not updated in the case where the update is performed, and
   the data to be deleted is data for which a delete command is issued.

3. The memory device according to claim 1, wherein
the selection unit selects an erase unit area having an oldest write time from the plurality of erase unit areas as the erase unit area to be subjected to garbage collection.

4. The memory device according to claim 1, wherein
the selection unit selects the erase unit area to be subjected to garbage collection at random from the plurality of erase unit areas.

5. The memory device according to claim 1, wherein
the selection unit selects, based on the valid/invalid information, an erase unit area having a largest amount of the invalid data or an erase unit area having an amount of the invalid data larger than a predetermined amount from the plurality of erase unit areas as the erase unit area to be subjected to garbage collection.

6. The memory device according to claim 1, wherein
the selection unit selects, based on the valid/invalid information and the deletion information, an erase unit area having a largest amount of the invalid data and the data to be deleted or an erase unit area having an amount of the invalid data and the data to be deleted larger than a predetermined amount from the plurality of erase unit areas as the erase unit area to be subjected to garbage collection.

7. The memory device according to claim 1, further comprising:
a volatile memory which stores the deletion information.

8. A non-transitory computer readable recording medium storing a program causing a computer to function as:
an address translation unit which generates address translation information relating a logical address of write data written to a nonvolatile memory to a physical address indicative of a write position of the write data in the nonvolatile memory, the nonvolatile memory including a plurality of erase unit areas, each of the erase unit areas including a plurality of write unit areas;
a write unit which writes the write data to the write position indicated by the physical address;
a generation unit which generates, based on the address translation information, valid/invalid information indicating whether data written to the plurality of erase unit areas is valid data or invalid data, the valid/invalid information including information relating identification information of the erase unit area to a logical address indicative of the valid data or the invalid data written to the erase unit area;
a selection unit which selects an erase unit area to be subjected to garbage collection from the plurality of erase unit areas;
a transmission unit which generates, based on the valid/invalid information, area information including a logical address indicative of valid data written to the erase unit area to be subjected to garbage collection, and transmits the area information to the information processing device;
a reception unit which receives deletion information including a logical address indicative of data to be deleted amongst the valid data in the erase unit area to be subjected to garbage collection from an information processing device communicating with the computer; and
a garbage collection unit which performs garbage collection of the valid data written to the erase unit area to be subjected to garbage collection excluding the data to be deleted.

* * * * *